Feb. 2, 1937. H. C. KESTEL 2,069,611
WINDOW REGULATING DEVICE
Filed Jan. 4, 1934
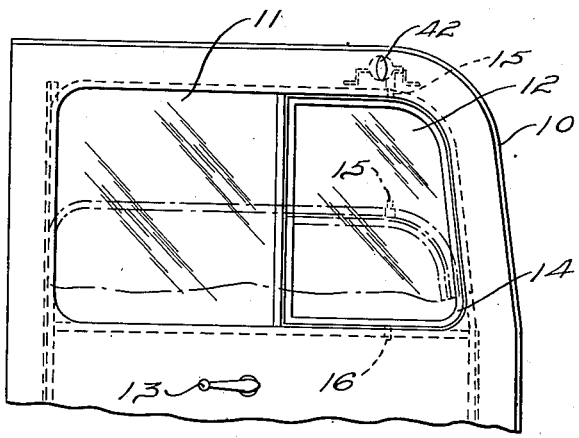
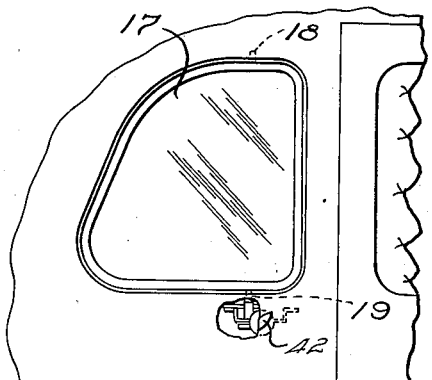
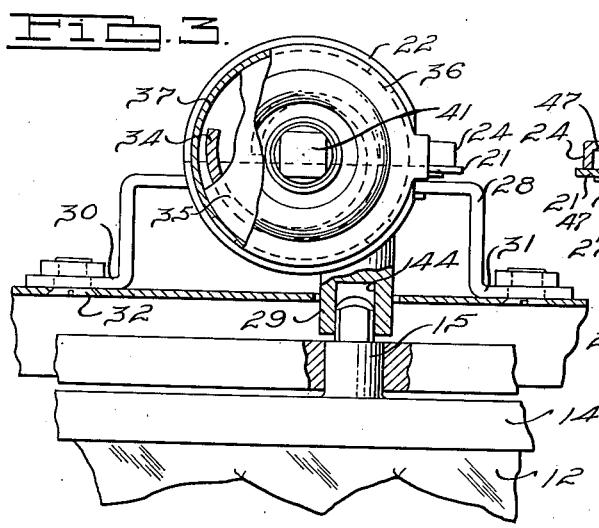
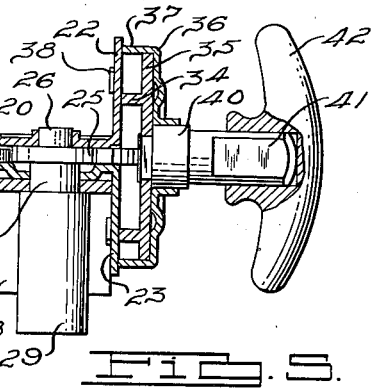
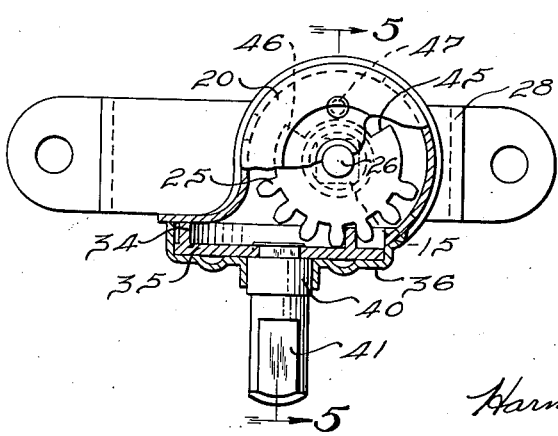
INVENTOR.
Henry C. Kestel.
BY
Harness, Dickey, Pierce & Hann.
ATTORNEYS.

UNITED STATES PATENT OFFICE 2,069,611

WINDOW REGULATING DEVICE

Henry C. Kestel, Toledo, Ohio, assignor to The Myers Regulator Company, Toledo, Ohio, a corporation of Ohio Application January 4, 1934, Serial No. 705,183

1 Claim. (Cl. 268—117)

The invention relates generally to window regulating devices and it has particular relation to a device for operating pivotal windows in automobiles.

One object of the invention is to provide a simple, inexpensive and easily operable device for swinging a ventilating window in an automobile that ordinarily will be mounted to swing about a vertical axis.

Another object of the invention is to provide a device for this purpose which requires very little space and which may be mounted on the upper and transverse part of a door frame having a pivoted window therein.

Another object of the invention is to provide a device of this character which can be readily installed and associated with a pivoted window either in the door of an automobile or in the rear part of the automobile.

Other objects of the invention will become apparent from the following description, the drawing relating thereto and from the claim hereinafter set forth.

For a better understanding of the invention, reference may be had to the accompanying drawing forming a part of the specification, wherein:

Figure 1 illustrates an automobile front door having a pivoted ventilating window therein which is controlled by a regulating device constructed according to one form of the invention.

Fig. 2 illustrates how the device may be associated with a pivoted window in the rear part of the automobile.

Fig. 3 is an enlarged view, partly in cross-section, of the window regulating device shown either by Fig. 1 or by Fig. 2.

Fig. 4 is a plan view of the device shown by Fig. 3 with certain parts broken away and shown in cross-section for the purposes of illustrating certain details more clearly.

Fig. 5 is a cross-sectional view taken substantially along the line 5—5 of Fig. 4.

Referring to Fig. 1, the door is indicated at 10, an ordinary reciprocable window is indicated at 11, and a pivotal ventilating window is indicated at 12. In the arrangement shown, both of the windows 11 and 12 are disposed in a vertically movable frame and a suitable regulating mechanism may be provided for moving them such as indicated generally at 13. For pivoting the window 12, the latter ordinarily may be mounted in a separate metal frame indicated at 14 which is pivotally mounted in the main window frame by trunnions 15 and 16. In order that the pivoted window may be turned the upper or lower trunnion as the case may be is of polygonal shape as shown best by Fig. 3. In the construction shown by Fig. 2 a rear quarter window is shown at 17 and this window similarly is provided with trunnions indicated at 18 and 19 for pivotally mounting it in the frame structure around the window so that it may be pivoted about a substantially vertical axis.

For operating either of the windows, a device is provided which as best shown by Fig. 5 includes casing walls 20 and 21 that have angularly directed portions 22 and 23 at one edge. The wall 20 has a flange 24 so as to provide a space between the walls and at spaced points this flange has legs 47 that project through openings in the wall 21 and which are swaged over so as to hold the walls together. Between the walls 20 and 21 a pinion or gear element 25 is provided which has a stub shaft 26 projecting therethrough and this stub shaft is journaled in openings in the central portions of the walls. Below the wall 21, the stub shaft 26 has an enlarged portion 27 that extends through the base portion of a U-shaped bracket 28 and on the lower side of the bracket the stub shaft is larger as indicated at 29 from which it follows that the bracket will be positively held in place. It, of course, will be understood that the shaft is rigidly held connected to the pinion or gear element 25 so that it will rotate therewith and will not separate therefrom. The bracket, as best shown by Fig. 3, terminates in leg portions 30 and 31 which are adapted to be secured to the door frame or automobile body by bolts as indicated at 32.

The pinion or gear element 25 projects outwardly beyond the plane of the walls 22 and 23 and is adapted to mesh with a scroll 34 which is rigidly mounted on or is integral with a plate 35. This plate is encased by a cover or housing 36 having a flange 37 and the latter has legs 38 which project through openings in the plate portions 22 and 23 and which are swaged over so as to hold the parts rigidly together. At its center the plate 35 is rigidly connected to a stub shaft 40 journaled in an opening in the cover 36 and which at its outer end terminates in a polygonal portion 41 that is rigidly connected to a handle operating element 42. It will be appreciated that by turning the handle 42, the scroll 34 will turn the pinion or gear element 25 which in turn will rotate the stub shaft 29.

The stub shaft 29 in the construction illustrated has a polygonal socket 44, as shown by Fig. 3, that is adapted to cooperate with the polygonal trunnion 15 shown in Fig. 1 or with the polygonal trunnion 19 shown by Fig. 2. It follows that when the handle 42 is manipulated, the stub shaft 29 will be turned and through the socket 44 and the trunnion on the window, that the window will be pivoted about its vertical axis. The stub shaft 29 in the arrangement shown by Fig. 1 is releasable from the window trunnion and is so located that when the pivoted window 12 is raised to its upper position, the trunnion 15 will be in the socket 44, from which it follows that a vertical movement of the window 12 along with the window 11 is permitted while still enabling pivoting the window 12 when it is in its upper position.

It will be appreciated that the device is simple and very compact and that little space is required for its mounting. This enables using the regulating device in the upper part of the frame in the door shown by Fig. 1 where ordinarily it would be difficult to install a regulating mechanism for pivoting the window 12. Use of the scroll and pinion or gear element enables easily pivoting the window by turning the handle 42 and furthermore, this type of mechanism insures a quiet as well as smooth operation.

While a complete pinion or gear element may be used, ordinarily a segment of a pinion or gear is sufficient and a construction of this character is shown particularly by Fig. 4. As shown by this figure, a sector of the pinion or gear segment is eliminated between the shoulders 45 and 46 and the plate 21 has a pin 47 secured thereto which projects into this cut-out portion of the pinion or gear element. Thus when the pinion is turned a certain distance in one direction it will engage the shoulder 45 and limit further movement and when it is turned in the other direction the shoulder 46 will engage the pin and limit movement in the latter direction.

Although more than one form of the invention has been illustrated and described in detail, it will be apparent to those skilled in the art that various modifications may be made without departing from the scope of the appended claim.

I claim:

A wall having an opening, a window mounted to slide vertically in said opening, down to expose it and up to close it, the window being mounted to swing on a vertical axis, mechanism mounted in the wall above the upper edge of the opening, the window and the mechanism having mating coupling parts at the upper edge of the opening so formed that rotation of the coupling part of the mechanism may cause rotation of the coupling part of the window and so formed that when the window is raised its upper edge automatically couples to the mechanism so that it may be rotated upon rotation of the coupling part of the mechanism and so formed that when the window is lowered the coupling is automatically disengaged, the mechanism including a rotatable handle accessible from in front of the wall and from a direction transverse to the plane of the window and operatively connected to the mechanism coupling part for rotating it when the handle is rotated.

HENRY C. KESTEL.